United States Patent
He et al.

(10) Patent No.: US 11,841,242 B2
(45) Date of Patent: Dec. 12, 2023

(54) PREPROCESSING METHOD AND DEVICE FOR DISTANCE TRANSFORMATION

(71) Applicant: Beijing IDRIVERPLUS Information Technology Co., Ltd., Beijing (CN)

(72) Inventors: Runlin He, Beijing (CN); Bo Yan, Beijing (CN); Cheng Xu, Beijing (CN); Fang Zhang, Beijing (CN); Xiaofei Li, Beijing (CN); Dezhao Zhang, Beijing (CN); Xiao Wang, Beijing (CN); Shuhao Huo, Beijing (CN)

(73) Assignee: BEIJING IDRIVERPLUS TECHNOLOGY CO., LTD., Beijing (CN)

( * ) Notice: Subject to any disclaimer, the term of this patent is extended or adjusted under 35 U.S.C. 154(b) by 142 days.

(21) Appl. No.: 17/217,253

(22) Filed: Mar. 30, 2021

(65) Prior Publication Data

US 2021/0310825 A1     Oct. 7, 2021

(30) Foreign Application Priority Data

Apr. 1, 2020   (CN) ......................... 202010249843.0

(51) Int. Cl.
   *G01C 21/00*   (2006.01)

(52) U.S. Cl.
   CPC ..... *G01C 21/3874* (2020.08); *G01C 21/3804* (2020.08); *G01C 21/3867* (2020.08)

(58) Field of Classification Search
   CPC ............ G01C 21/3874; G01C 21/3804; G01C 21/3867; G05D 1/0274; G05D 1/021; G06F 17/11; G06T 2207/20041
   See application file for complete search history.

(56) References Cited

U.S. PATENT DOCUMENTS

2012/0148093 A1 *   6/2012   Sharma .................. G06T 7/251
                                                          382/106
2022/0270268 A1 *   8/2022   Radha ..................... G06T 7/248

OTHER PUBLICATIONS

Likhachev, Planning Long Dynamically-Feasible Maneuvers for Autonomous Vehicles, 2009, MIT Press (Year: 2009).*
Tanzmeister, Efficient Evaluation of Collisions and Costs on Grid Maps for Autonomous Vehicle Motion Planning, 2014, IEEE Transactions on Intelligent Transportation Systems (vol. 15, Issue: 5, pp. 2249-2260) (Year: 2014).*

* cited by examiner

*Primary Examiner* — Anne Marie Antonucci
*Assistant Examiner* — Patrick Daniel Mohl
(74) *Attorney, Agent, or Firm* — Panitch Schwarze belsiario & Nadel LLP

(57) ABSTRACT

Disclosed are a preprocessing method and device for distance transformation. The method includes: acquiring a first grid map; calculating a second parameter of a vehicle model; calculating a precision of a second grid map according to the second parameter of the vehicle model and a precision of the first grid map; calculating the numbers of rows and columns of the second grid map according to information on the first grid map, the precision of the second grid map and the second parameter of the vehicle model; determining for each cell of the second grid map a state value according to the numbers of obstacle cells within said each cell; and determining in the first grid map at least one cell requiring no processing, according to the state value. Therefore, during the distance transformation, the processing speed for determining the distance value of each cell is increased.

11 Claims, 3 Drawing Sheets

|   |   |   |   |   |
|---|---|---|---|---|
| 1 | 1 | 1 | 1 | 1 |
| 1 | 0 | 0 | 0 | 1 |
| 1 | 0 | 0 | 0 | 1 |
| 1 | 0 | 0 | 0 | 1 |
| 1 | 1 | 1 | 1 | 1 |

PREPROCESSING METHOD AND DEVICE FOR DISTANCE TRANSFORMATION

CROSS-REFERENCE TO RELATED PATENT APPLICATION

The present disclosure claims the benefit of and priority to Chinese Patent Application No. 202010249843.0 filed on Apr. 1, 2020, the entire disclosure of which is incorporated by reference herein.

TECHNICAL FIELD

The present disclosure relates to the field of data processing, and in particular to a preprocessing method and device for distance transformation.

BACKGROUND

Thanks to the rapid development of mobile robot technology and the widespread application of artificial intelligence technology represented by computer vision, the autonomous driving technology has been gradually implemented and integrated into our lives. With the aid of reliable sensors and efficient processors, autonomous vehicles can achieve accurate positioning perception and intelligent decision-making for planning, so as to drive autonomously and safely in unpredictable environments. The planning herein refers to the path planning, in which it is necessary to comprehensively consider the vehicle's current information and the perceived environmental information to plan a safe and collision-free path suitable for vehicle movement.

There are two core concerns for the path planning, including safety and real-time feasibility. During the autonomous driving, for the safety, it is required to avoid collisions with dynamic and static obstacles, and for the real-time feasibility, it is required to calculate in real time a path that meets characteristics of the vehicle. As a key method for avoiding collisions, the distance transformation was first applied to binary images, the main concept of which was to convert binary images into grayscale images by calculating the distance in space between target points and background points. Nowadays, the distance transformation has been widely applied in various fields, such as target recognition, spatial analysis and the like. For the distance transformation used in autonomous vehicles, the distance from each grid cell to the nearest obstacle cell shall be calculated, which results in a relatively large calculation amount as a whole. In view of this problem, the present disclosure proposes a fast distance transformation method for autonomous vehicles, which reduces the calculation amount for distance transformation by preprocessing the map, so as to meet the demands in actual scenes.

Currently, in each path planning algorithm for complex environment, it is necessary to process obstacle information with a distance transformation method to form a corresponding grid map. This type of map is also called occupancy grid map, which includes two types of cells that are free cells and obstacle cells. In each cell, information such as the distance to the nearest obstacle cell is recorded, and this information serves as an input for the path planning.

Generating an obstacle distance transformation-based grid map generally includes following steps:
processing sensor data, determining bases for discriminating obstacles (for example, a basis that a gray value is less than a certain value), and obtaining a binary grid map containing two kinds of cells that are obstacle cells and free cells; and
calculating information such as a distance from each cell to a nearest obstacle with a classic chamfering distance transformation algorithm.

The path planning in a complex unstructured environment is more concerned with the region near the obstacle, and the region far away from the obstacle has no influence on the cost of the path searching. In traditional distance transformation, the entire grid map is processed directly based on the current high-precision grid. However, many information of grid is invalid for the path planning of autonomous vehicles. For example, in an open region, a large amount of unnecessary information may be generated when the distance transformation is performed on the entire region. If the grid precision is high, the calculation amount will be rather large and time-consuming. If the grid precision is not enough, it is very likely that the pose estimation cannot be achieved or even a collision will occur. Therefore, it is basically impossible to effectively reduce the amount of calculation simply by selecting a grid of a suitable size.

SUMMARY

An object of embodiments of the present disclosure is to provide a preprocessing method and device for distance transformation to solve the problem in the prior art that the calculation amount of distance transformation is large.

In order to solve the problem, in a first aspect, the present disclosure provides a preprocessing method for distance transformation, which includes:
- acquiring a first grid map, where the first grid map includes first grid map information that includes one or more obstacle cells of the first grid map, the number of rows of the first grid map, the number of columns of the first grid map, and a precision of the first grid map;
- calculating a second parameter of a vehicle model of a vehicle according to a first parameter of the vehicle model;
- calculating a precision of a second grid map according to the second parameter of the vehicle model and the precision of the first grid map;
- calculating the number of rows of the second grid map and the number of columns of the second grid map according to the number of rows of the first grid map, the number of columns of the first grid map, the precision of the first grid map, the precision of the second grid map, and the second parameter of the vehicle model;
- determining, for each cell of the second grid map, a state value according to the number of the obstacle cells which are within said each cell; and
- determining in the first grid map at least one cell that requires no processing, according to the state value of each cell of the second grid map.

In a possible implementation, the first parameter of the vehicle model includes a length of the vehicle and a width of the vehicle, the second parameter of the vehicle model includes a diagonal length of the vehicle, and the calculating a second parameter of a vehicle model of a vehicle according to a first parameter of the vehicle model specifically includes:
- calculating a square root of a sum of a square of the length of the vehicle and a square of the width of the vehicle, as the diagonal length of the vehicle.

In a possible implementation, the calculating a precision of a second grid map according to the second parameter of the vehicle model and the precision of the first grid map specifically includes that:

the diagonal length of the vehicle divided by the precision of the first grid map is rounded and then multiplied by the precision of the first grid map, to obtain the precision of the second grid map.

In a possible implementation, the calculating the number of rows of the second grid map and the number of columns of the second grid map according to the number of rows of the first grid map, the number of columns of the first grid map, the precision of the first grid map, the precision of the second grid map, and the second parameter of the vehicle model specifically includes that:

a product of the number of rows of the first grid map and the precision of the first grid map is divided by the precision of the second grid map and rounded to obtain the number of rows of the second grid map; and a product of the number of columns of the first grid map and the precision of the first grid map is divided by the precision of the second grid map and rounded to obtain the number of columns of the second grid map.

In a possible implementation, the determining, for each cell of the second grid map, a state value according to the number of the obstacle cells which are within said each cell specifically includes:

determining the state value of each of at least one first type cell in the second grid map as 0, wherein the number of the obstacle cells within said each of the at least one first type cell is 0; and determining the state value of each of at least one second type cell in the second grid map as 1, wherein the number of the obstacle cells within said each of the at least one second type cell is greater than 0, and the second grid map is composed of the at least one first type cell and the at least one second type cell.

In a possible implementation, the determining in the first grid map at least one cell that requires no processing, according to the state value of each cell of the second grid map specifically includes:

marking a first cell among the at least one first type cell as a cell requiring no processing, if each cell adjacent to the first cell is the first type cell, mapping the first cell to the first grid map, and marking a distance transformed value of the first cell as twice the precision of the second grid map.

In a second aspect, the present disclosure provides a preprocessing device for distance transformation, which includes:

an acquisition unit configured to acquire a first grid map, where the first grid map includes first grid map information that includes one or more obstacle cells of the first grid map, the number of rows of the first grid map, the number of columns of the first grid map, and a precision of the first grid map;

a calculation unit configured to calculate a second parameter of a vehicle model of a vehicle according to a first parameter of the vehicle model, calculate a precision of a second grid map according to the second parameter of the vehicle model and the precision of the first grid map, and calculate the number of rows of the second grid map and the number of columns of the second grid map according to the number of rows of the first grid map, the number of columns of the first grid map, the precision of the first grid map, the precision of the second grid map, and the second parameter of the vehicle model; and a determination unit configured to determine, for each cell of the second grid map, a state value according to the number of the obstacle cells which are within said each cell, and determine in the first grid map at least one cell that requires no processing, according to the state value of each cell of the second grid map.

In a third aspect, the present disclosure provides an apparatus, which includes a memory and a processor, where the memory is configured to have at least one program stored therein, and the processor is configured to, when executes the at least one program, implement any method according to the first aspect.

In a fourth aspect, the present disclosure provides a computer program product including at least one instruction which, when runs on a computer, causes a computer to implement any method according to the first aspect.

In a fifth aspect, the present disclosure provides a computer-readable storage medium having at least one computer program stored therein, where the at least one computer program is executed by a processor to implement any method according to the first aspect.

By applying the preprocessing method and device for distance transformation, at least one cell that requires no processing is marked in advance by preprocessing the first grid map, and at least one distance transformed value thereof is also calculated. Thus, while calculating the distance value of each cell, it is unnecessary to re-calculate the distance value of the at least one cell that requires no processing, which reduces the calculation amount of distance transformation and ensures the real-time performance of the subsequent path planning algorithm.

BRIEF DESCRIPTION OF THE DRAWINGS

FIG. 2 is a schematic diagram of a first grid map;

FIG. 3 is a schematic diagram of a second grid map; and

DETAILED DESCRIPTION

Figure 1:
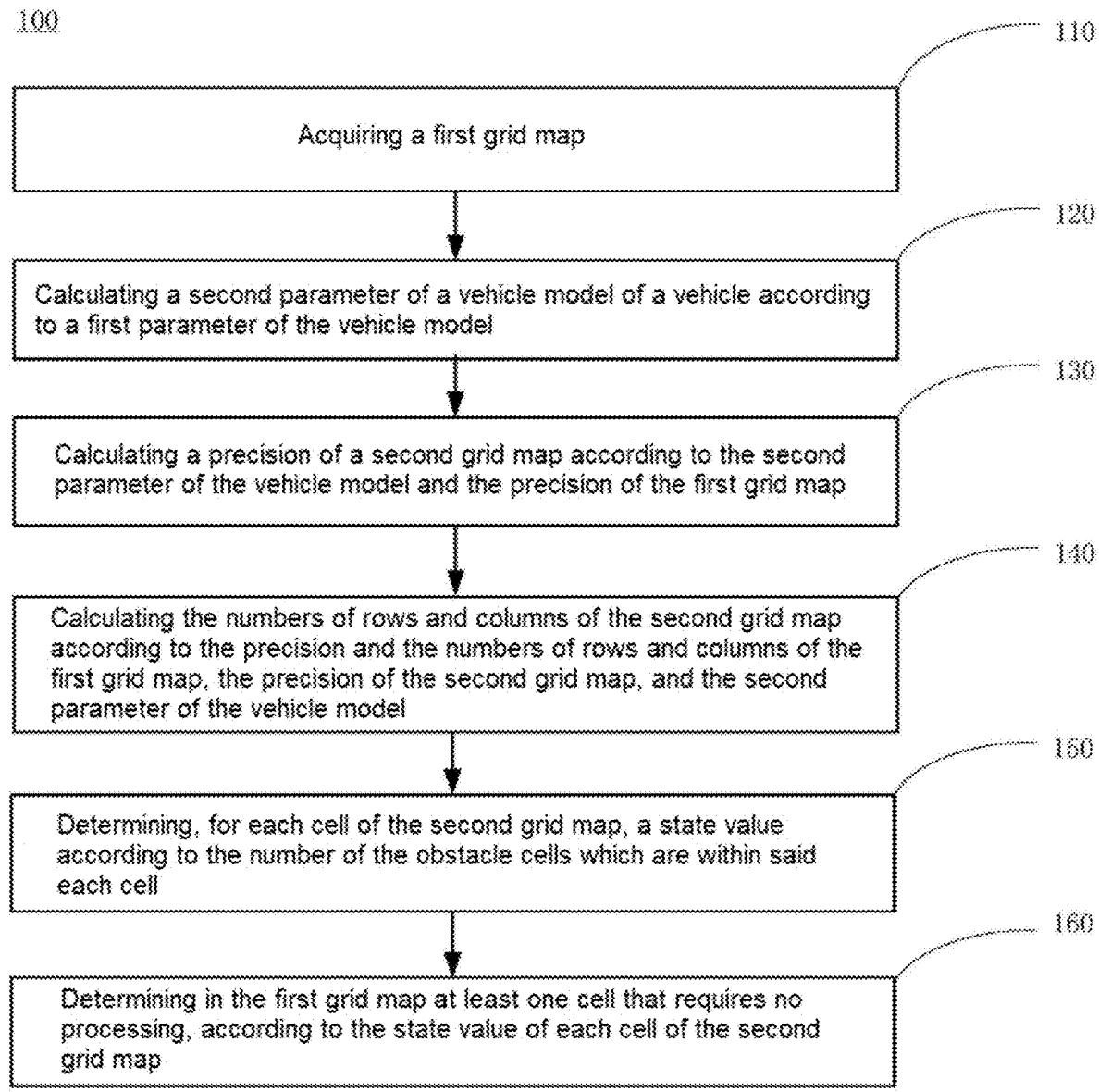
FIG. 1 is a schematic flowchart of a preprocessing method for distance transformation provided by a first embodiment of the present disclosure.

The present disclosure will be further described in detail below with reference to the accompanying drawings and embodiments. It shall be understood that the specific embodiments described herein are only used to explain the present disclosure, but not to limit the present disclosure. In addition, it should be noted that, for the convenience of description, only the parts related to the present disclosure are shown in the drawings.

It should be noted that the embodiments of the present disclosure and features of the embodiments may be combined with each other in any form as long as they are not contradictory. The present disclosure will be described in detail below with reference to the accompanying drawings and embodiments.

FIG. 1 is a schematic flowchart of a preprocessing method for distance transformation provided by a first embodiment of the present disclosure. The execution subject of the present disclosure may be a terminal, server or processor with a calculating function. The present disclosure takes the application of this method to unmanned vehicles as an example for description below. When this method is applied to an unmanned vehicle, the execution subject of the method is an automated vehicle control unit (AVCU), which is namely a central processing unit of the unmanned vehicle and equivalent to the "brain" of the unmanned vehicle. In the present disclosure, the distance transformation may be performed after preprocessing the original first grid map of high-precision according to the first parameter of the vehicle and marking at least one cell that requires no calculation, which omits the distance calculation that is ineffective for path planning in the first grid map, and thereby reduces the calculation amount of distance transformation and ensures the real-time performance of the subsequent path planning algorithm. As shown in FIG. 1, the present disclosure includes following steps.

In step 110, a first grid map is acquired. The first grid map includes first grid map information, and the first grid map information includes one or more obstacle cells, the number of rows, the number of columns, and a precision of the first grid map.

Specifically, obstacle information obtained by various sensors, such as lidar, ultrasonic radar and the like, may be processed to generate the first grid map. The first grid map information may include one or more free cells and one or more obstacle cells. The cell value of each free cell may be marked as 0, and the cell value of each obstacle cell may be marked as 1.

In step 120, a second parameter of a vehicle model of a vehicle is calculated according to a first parameter of the vehicle model.

The first parameter of the vehicle model may be extracted from the preset parameters, including the length and width of the vehicle. Then, the diagonal length of the vehicle, which is an example of the second parameter of the vehicle model, may be obtained by summing up the squared length of the vehicle and the squared width of the vehicle and calculating the square root of the resulting sum. The specific formula may be as follows:

$$L=\sqrt{a^2+b^2}$$

where a denotes the length of the vehicle, b denotes the width of the vehicle, and L denotes the diagonal length of the vehicle.

In step 130, a precision of a second grid map is calculated according to the second parameter of the vehicle model and the precision of the first grid map.

Specifically, the precision of the second grid map may be obtained by dividing the diagonal length of the vehicle by the precision of the first grid map, rounding the resulting quotient, and multiplying the rounding result by the precision of the first grid map. The specific formula may be as follows:

$$C=\mathrm{ceil}(L/c)*c$$

where c denotes the precision of the first grid map, C denotes the precision of the second grid map, and ceil denotes a rounding up function.

In step 140, the number of the second grid map rows of and the number of columns of the second grid map are calculated according to the number of rows of the first grid map, the number of columns of the first grid map, the precision of the first grid map, the precision of the second grid map, and the second parameter of the vehicle model.

Specifically, the number of rows of the second grid map may be obtained by multiplying the number of rows of the first grid map by the precision of the first grid map, dividing the resulting product by the precision of the second grid map, and rounding the resulting quotient; and the number of columns of the second grid map may be obtained by multiplying the number of columns of the first grid map by the precision of the first grid map, dividing the resulting product by the precision of the second grid map, and rounding the resulting quotient. The specific formula may be as follows:

$$nm=\mathrm{ceil}(m*c/C)$$

$$nn=\mathrm{ceil}(n*c/C)$$

where m denotes the number of rows of the first grid map, n denotes the number of columns of the first grid map, nm denotes the number of rows of the second grid map, and nn denotes the number of columns of the second grid map.

In step 150, for each cell of the second grid map, a state value is determined according to the number of obstacle cells which are within said each cell.

Specifically, the state value of each of at least one first type cell in the second grid map may be determined as 0 and the state value of each of at least one second type cell in the second grid map may be determined as 1, where each of the at least one first type cell includes no obstacle cell, each of the at least one second type cell includes one or more obstacle cells, and the second grid map is composed of the at least one first type cell and the at least one second type cell. The specific formula may as follows:

$$\mathrm{State} = \begin{cases} 0, k = 0 \\ 1, k \geq 1 \end{cases}$$

where State denotes the state value of a cell in the second grid map, which is namely the cell value, and k denotes the number of included obstacle cells.

In step 160, at least one cell that requires no processing is determined according to a binary image of the second grid map.

In the process of converting the first grid map to the second grid map, it may be necessary to add obstacles to the right and bottom of the first grid map. For example, when the first grid map is converted into a second grid map with the diagonal length of the vehicle taken as the grid cell size of the second grid map, appropriate obstacle cells may be added to the right and bottom boundaries of the first grid map if a complete cell of the second grid map cannot be formed on the boundaries.

Figures 2, 3:
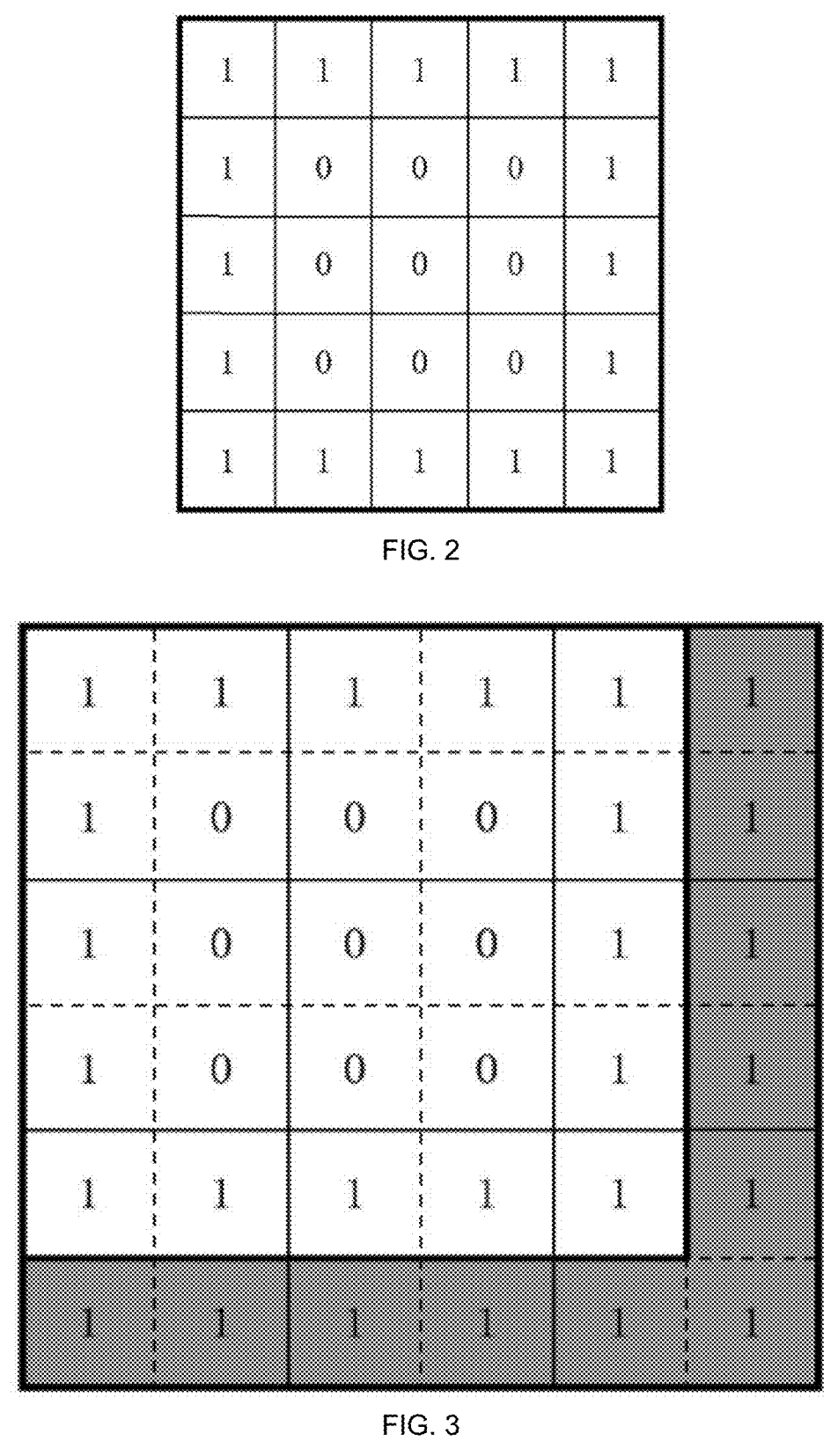

With reference to FIG. 2 that is a schematic diagram of a first grid map, the thick solid lines represent boundaries of the first grid map, and the thin solid lines represent boundaries of primary cells, with 0 representing free primary cells, and 1 representing obstacle primary cells.

FIG. 3 is a schematic diagram of a second grid map. It is assumed herein that the characteristic dimension of the vehicle is twice the length of a primary cell, and the dark ones are the newly added primary cells. As can be seen from FIG. 3, only the most central secondary cell in the second grid map is a free secondary cell.

A first cell among the at least one first type cell may be marked as a cell requiring no processing, when all cells adjacent to the first cell are the first type cells. Then, the first cell may be mapped to the first grid map, and a distance transformed value of the first cell may be marked as twice the precision of the second grid map.

Specifically, the second grid map may be scanned. If a secondary cell is a first type cell (i.e., the free secondary cell)

and its 8 adjacent secondary cells are all free secondary cells, the secondary cell may be marked as a secondary cell that requires no processing. According to the mapping relationship between the first grid map and the second grid map, the secondary cell that requires no processing may be marked into the first grid map, and the distance transformed value may be directly marked as 2*C.

By applying the preprocessing method for distance transformation, at least one cell that requires no processing is marked in advance by preprocessing the first grid map, and at least one distance transformed value thereof is also calculated. Thus, while calculating the distance value of each cell, it is unnecessary to re-calculate the distance value of the at least one cell that requires no processing, which reduces the calculation amount of distance transformation and ensures the real-time performance of the subsequent path planning algorithm.

Figure 4:
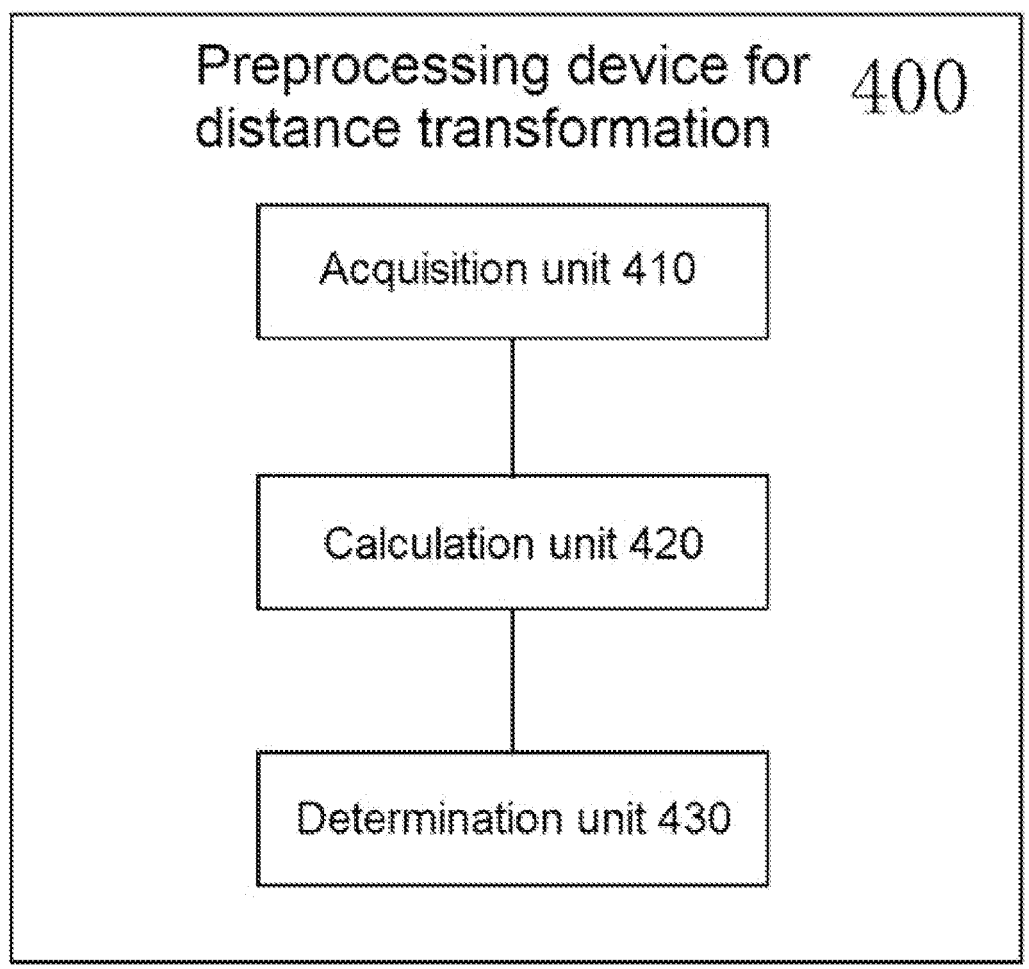
FIG. 4 is a schematic diagram of a structure of a preprocessing device for distance transformation provided by a second embodiment of the present disclosure.

FIG. 4 is a schematic diagram of a structure of a preprocessing device for distance transformation provided by a second embodiment of the present disclosure. The preprocessing device for distance transformation may be applied in the preprocessing method for distance transformation. As shown in FIG. 4, the preprocessing device for distance transformation includes an acquisition unit 410, a calculation unit 420, and a determination unit 430.

The acquisition unit 410 is configured to acquire a first grid map, where the first grid map includes first grid map information that includes one or more obstacle cells, the number of rows of the first grid map, the number of columns of the first grid map, and a precision of the first grid map.

The calculation unit 420 is configured to calculate a second parameter of a vehicle model of a vehicle according to a first parameter of the vehicle model.

The calculation unit 420 is further configured to calculate a precision of a second grid map according to the second parameter of the vehicle model and the precision of the first grid map.

The calculation unit 420 is further configured to calculate the number of rows of the second grid map and the number of columns of the second grid map according to the number of rows of the first grid map, the number of columns of the first grid map, the precision of the first grid map, the precision of the second grid map, and the second parameter of the vehicle model.

The determination unit 430 is configured to determine, for each cell of the second grid map, a state value according to the number of the obstacle cells which are within said each cell.

The determination unit 430 is further configured to determine in the first grid map at least one cell that requires no processing, according to the state value of each cell of the second grid map.

Furthermore, the calculation unit 420 may be specifically configured to calculate a square root of a sum of a square of the length of the vehicle and a square of the width of the vehicle as the diagonal length of the vehicle.

Furthermore, the calculation unit 420 may be specifically configured so that the diagonal length of the vehicle divided by the precision of the first grid map is rounded and then multiplied by the precision of the first grid map to obtain the precision of the second grid map.

Furthermore, the calculation unit 420 may be specifically configured so that:
a product of the number of rows of the first grid map and the precision of the first grid map is divided by the precision of the second grid map and rounded to obtain the number of rows of the second grid map; and
a product of the number of columns of the first grid map and the precision of the first grid map is divided by the precision of the second grid map and rounded to obtain the number of columns of the second grid map.

Furthermore, the determination unit 430 may be specifically configured to:
determine the state value of each of at least one first type cell in the second grid map as 0, where the number of the obstacle cells within said each of the at least one first type cell is 0; and
determine the state value of each of at least one second type cell in the second grid map as 1, where the number of the obstacle cells within said each of the at least one second type cell is greater than 0, and the second grid map is composed of the at least one first type cell and the at least one second type cell.

Furthermore, the determination unit 430 may be specifically configured to: mark a first cell among the at least one first type cell as a cell requiring no processing, if each cell adjacent to the first cell is the first type cell, map the first cell to the first grid map, and mark a distance transformed value of the first cell as twice the precision of the second grid map.

By applying the preprocessing device for distance transformation, at least one cell that requires no processing is marked in advance by preprocessing the first grid map, and at least one distance transformed value thereof is also calculated. Thus, while calculating the distance value of each cell, it is unnecessary to re-calculate the distance value of the at least one cell that requires no processing, which reduces the calculation amount of distance transformation and ensures the real-time performance of the subsequent path planning algorithm.

The third embodiment of the present disclosure provides an apparatus, which includes a memory and a processor. The memory is configured to have at least one program stored therein, and may be connected to the processor via a bus. The memory may be a non-volatile memory, such as a hard disk drive and a flash memory, and has at least one software program and at least one device driver stored therein. The software program can execute various functions of the method provided by the embodiments of the present disclosure, and the device driver may be a network and interface driver. The processor is configured to execute the software program, and when the software program is executed, the method provided in the first embodiment of the present disclosure can be implemented.

The fourth embodiment of the present disclosure provides a computer program product including at least one instruction which, when runs on a computer, causes a computer to implement the method provided in the first embodiment of the present disclosure.

The fifth embodiment of the present disclosure provides a computer-readable storage medium having at least one computer program stored therein, where the at least one computer program is executed by a processor to implement the method provided in the first embodiment of the present disclosure.

Those skilled in the art shall be further aware that the units and algorithm steps of examples described in the embodiments of the present disclosure can be implemented by an electronic hardware, computer software, or a combination thereof. In order to clearly illustrate the interchangeability of hardware and software, the elements and steps of each example have been generally illustrated in the above description in accordance with the functions. Whether the functions are implemented by hardware or software depends on the specific application and design constraints of the technical solution. Those skilled in the art may implement the aforesaid functions in varying ways for each particular application, and such implementation should not be interpreted as causing a departure from the scope of the present disclosure.

The steps of the method or algorithm described in combination with the embodiments of the present disclosure can be implemented by hardware, or a software module executed by a processor, or a combination thereof. The software module may be placed in a random access memory (RAM), an internal memory, a read-only memory (ROM), an electrically programmable ROM, an electrically erasable programmable ROM, a register, a hard disk, a removable disk, or any other form of storage medium known in the art.

The aforesaid specific implementations further describe the object, technical solutions and beneficial effects of the present disclosure in detail. It should be understood that the implementations are only specific implementations of the present disclosure and are not used to limit the protection scope of the present disclosure. Any modification, equivalent replacement, improvement, or the like made within the concept and principle of the present disclosure shall be included in the protection scope of the present disclosure.

What is claimed is:

1. A preprocessing method for distance transformation, comprising:
   acquiring a first grid map, wherein the first grid map includes first grid map information that includes one or more obstacle primary cells, the number of rows of the first grid map, the number of columns of the first grid map, and a precision of the first grid map;
   calculating a second parameter of a vehicle model of a vehicle according to a first parameter of the vehicle model;
   calculating a precision of a second grid map according to the second parameter of the vehicle model and the precision of the first grid map;
   calculating the number of rows of the second grid map and the number of columns of the second grid map according to the number of rows of the first grid map, the number of columns of the first grid map, the precision of the first grid map, the precision of the second grid map, and the second parameter of the vehicle model;
   determining, for each secondary cell of the second grid map, a state value according to the number of the obstacle primary cells corresponding to said each secondary cell when mapping the first grid map onto the second grid map; and
   determining in the first grid map at least one primary cell that requires no processing according to the state value of each secondary cell of the second grid map,
   wherein the determining, for each secondary cell of the second grid map, a state value according to the number of the obstacle primary cells corresponding to said each secondary cell when mapping the first grid map onto the second grid map comprises:
   determining the state value of each first type secondary cell in the second grid map as 0, wherein the number of the obstacle primary cells corresponding to said each first type secondary cell is 0,
   wherein the determining in the first grid map at least one primary cell that requires no processing, according to the state value of each secondary cell of the second grid map comprises:
   determining among first type secondary cells at least one secondary cell, each adjacent secondary cell of which is the first type secondary cell, and marking distance transformed values of primary cells corresponding to the at least one secondary cell as twice the precision of the second grid map,
   wherein the preprocessing method further comprises performing distance transformation calculation on remaining primary cells in the first grid map other than the primary cells marked with the distance transformed values, performing path planning for the vehicle model based on the first grid map subjected to the distance transformation calculation so that the vehicle model performs autonomous driving along a path obtained by the path planning.

2. The preprocessing method according to claim 1, wherein the first parameter of the vehicle model includes a length and a width of the vehicle, the second parameter of the vehicle model includes a diagonal length of the vehicle, and the calculating a second parameter of a vehicle model of a vehicle according to a first parameter of the vehicle model comprises:
   calculating a square root of a sum of a square of the length of the vehicle and a square of the width of the vehicle as the diagonal length of the vehicle.

3. The preprocessing method according to claim 1, wherein the calculating a precision of a second grid map according to the second parameter of the vehicle model and the precision of the first grid map comprises that:
   the diagonal length of the vehicle divided by the precision of the first grid map is rounded and then multiplied by the precision of the first grid map, to obtain the precision of the second grid map.

4. The preprocessing method according to claim 1, wherein the calculating the number of rows of the second grid map and the number of columns of the second grid map according to the number of rows of the first grid map, the number of columns of the first grid map, the precision of the first grid map, the precision of the second grid map, and the second parameter of the vehicle model comprises that:
   a product of the number of rows of the first grid map and the precision of the first grid map is divided by the precision of the second grid map and rounded to obtain the number of rows of the second grid map;
   a product of the number of columns of the first grid map and the precision of the first grid map is divided by the precision of the second grid map and rounded to obtain the number of columns of the first grid map.

5. The preprocessing method according to claim 1, wherein the determining, for each secondary cell of the second grid map, a state value according to the number of the obstacle primary cells corresponding to said each secondary cell when mapping the first grid map onto the second grid map further comprises:
   determining the state value of each second type secondary cell in the second grid map as 1, wherein the number of the obstacle primary cells corresponding to said each second type secondary cell is greater than 0, and the second grid map is composed of the first type secondary cells and at least one second type secondary cell.

6. A non-transitory computer-readable storage medium having at least one computer program stored therein, wherein the at least one computer program is executed by a processor to implement the preprocessing method according to claim 1.

7. A preprocessing device for distance transformation, comprising:
   an acquisition unit configured to acquire a first grid map, wherein the first grid map includes first grid map information that includes one or more obstacle primary cells, the number of rows of the first grid map, the number of columns of the first grid map, and a precision of the first grid map;

a calculation unit configured to calculate a second parameter of a vehicle model of a vehicle according to the first parameter of the vehicle model, calculate a precision of a second grid map according to the second parameter of the vehicle model and the precision of the first grid map, and calculate the number of rows of the second grid map and the number of columns of the second grid map according to the number of rows of the first grid map, the number of columns of the first grid map, the precision of the first grid map, the precision of the second grid map, and the second parameter of the vehicle model; and a determination unit configured to determine, for each secondary cell of the second grid map, a state value according to the number of the obstacle primary cells corresponding to said each cell when mapping the first grid map onto the second grid map, and determine in the first grid map at least one primary cell that requires no processing, according to the state value of each secondary cell of the second grid map, wherein a determination unit is further configured to determine the state value of each first type secondary cell in the second grid map as 0, wherein the number of the obstacle primary cells corresponding to said each first type secondary cell is 0, determine among first type secondary cells at least one secondary cell, each adjacent secondary cell of which is the first type secondary cell, and determine distance transformed values of primary cells corresponding to the at least one secondary cell as twice the precision of the second grid map, wherein the preprocessing device is further configured to perform distance transformation calculation on remaining primary cells in the first grid map other than the primary cells marked with the distance transformed values and perform path planning for the vehicle model based on the first grid map subjected to the distance transformation calculation so that the vehicle model performs autonomous driving along a path obtained by the path planning.

8. The preprocessing device according to claim 7, wherein the first parameter of the vehicle model includes a length and a width of the vehicle, the second parameter of the vehicle model includes a diagonal length of the vehicle, and the calculation unit is further configured to calculate a square root of a sum of a square of the length of the vehicle and a square of the width of the vehicle as the diagonal length of the vehicle.

9. The preprocessing device according to claim 7, wherein the calculation unit is further configured so that the diagonal length of the vehicle divided by the precision of the first grid map is rounded and then multiplied by the precision of the first grid map to obtain the precision of the second grid map.

10. The preprocessing device according to claim 7, wherein the calculation unit is further configured so that:

a product of the number of rows of the first grid map and the precision of the first grid map is divided by the precision of the second grid map and rounded to obtain the number of rows of the second grid map; and a product of the number of columns of the first grid map and the precision of the first grid map is divided by the precision of the second grid map and rounded to obtain the number of columns of the second grid map.

11. The preprocessing device according to claim 7, wherein the determination unit is further configured to determine the state value of each second type secondary cell in the second grid map as 1, where the number of the obstacle primary cells corresponding to the at least one second type cell is greater than 0, and the second grid map is composed of the first type secondary cells and at least one second type secondary cell.

* * * * *